(12) United States Patent
Cordeiro

(10) Patent No.: US 10,931,862 B2
(45) Date of Patent: Feb. 23, 2021

(54) VEHICLE SYSTEM FOR COMMUNICATION WITH TRAILER SENSOR

(71) Applicant: MAGNA ELECTRONICS INC., Auburn Hills, MI (US)

(72) Inventor: Alan M. Cordeiro, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/022,787

(22) Filed: Jun. 29, 2018

(65) Prior Publication Data

US 2019/0007597 A1 Jan. 3, 2019

Related U.S. Application Data

(60) Provisional application No. 62/527,135, filed on Jun. 30, 2017.

(51) Int. Cl.
| | | |
|---|---|---|
| *H04N 5/232* | (2006.01) | |
| *B60R 1/00* | (2006.01) | |
| *H01Q 1/32* | (2006.01) | |
| *B60Q 9/00* | (2006.01) | |
| *H04N 5/38* | (2006.01) | |

(52) U.S. Cl.
CPC ........... *H04N 5/23203* (2013.01); *B60R 1/00* (2013.01); *B60R 1/002* (2013.01); *H01Q 1/3208* (2013.01); *H01Q 1/3225* (2013.01); *H01Q 1/3291* (2013.01); *B60Q 9/00* (2013.01); *B60R 2300/406* (2013.01); *H04N 5/38* (2013.01)

(58) Field of Classification Search
CPC .. B60Q 9/00; B60R 1/00; B60R 1/002; B60R 2300/406; H01Q 1/3208; H01Q 1/3225; H01Q 1/3291; H04N 5/23203; H04N 5/38

See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |

(Continued)

FOREIGN PATENT DOCUMENTS

WO 2018007995 A1 1/2018

*Primary Examiner* — Farzana Hossain
(74) *Attorney, Agent, or Firm* — Honigman LLP

(57) ABSTRACT

A vision system for a vehicle towing a trailer includes a camera disposed at a rear portion of the trailer and viewing rearward of the trailer. A trailer antenna is disposed at the trailer and in data communication with the camera, and a vehicle antenna is disposed at the vehicle and in data communication with a control unit disposed at the vehicle. The trailer antenna is operable to transmit signals representative of image data captured by the camera toward a road surface along which the vehicle and trailer are traveling so that the transmitted signals reflect off of the road surface and toward the vehicle antenna disposed at the vehicle. The vehicle antenna receives the reflected RF signals and communicates data to the control unit that are representative of the received reflected signals.

17 Claims, 1 Drawing Sheet

(56) References Cited

U.S. PATENT DOCUMENTS

| | | |
|---|---|---|
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 2010/0245066 A1 | 9/2010 | Sarioglu et al. |
| 2011/0181457 A1* | 7/2011 | Basten .................. G01B 7/042 342/70 |
| 2012/0136530 A1* | 5/2012 | Kanenari ............ B60C 23/007 701/33.4 |
| 2016/0142596 A1* | 5/2016 | DePaschoal ......... H04N 5/2252 348/38 |
| 2017/0217372 A1* | 8/2017 | Lu .......................... B60R 1/003 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2018/0278895 A1* | 9/2018 | Greenwood .......... H04N 7/183 |
| 2018/0321142 A1 | 11/2018 | Seifert |
| 2019/0071018 A1 | 3/2019 | Uken et al. |
| 2019/0072669 A1 | 3/2019 | Duque Biarge et al. |

\* cited by examiner

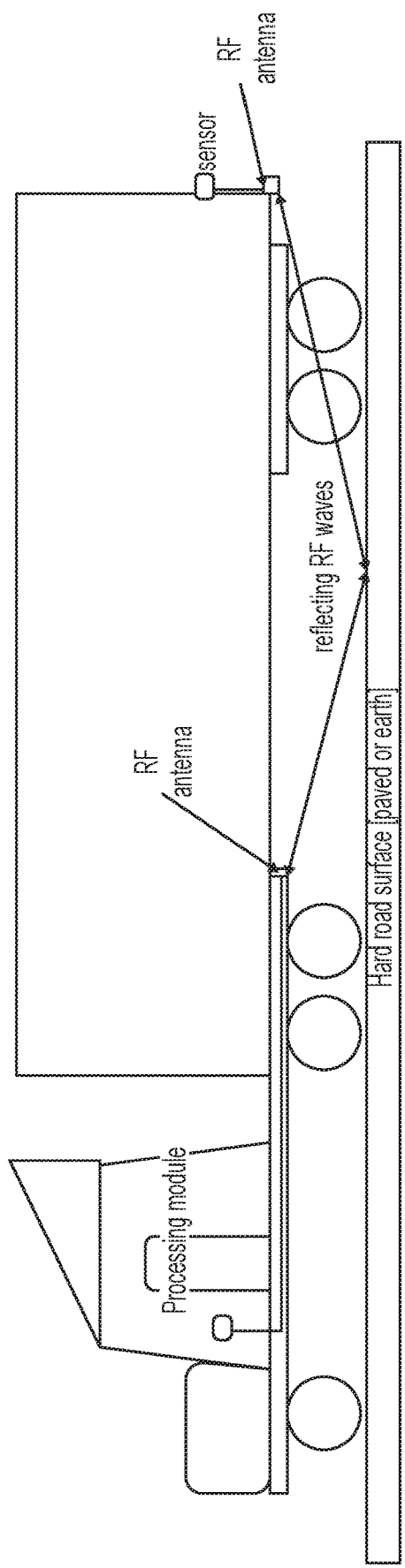

VEHICLE SYSTEM FOR COMMUNICATION WITH TRAILER SENSOR

CROSS REFERENCE TO RELATED APPLICATION

The present application claims the filing benefits of U.S. provisional application Ser. No. 62/527,135, filed Jun. 30, 2017, which is hereby incorporated herein by reference in its entirety.

FIELD OF THE INVENTION

The present invention relates generally to a vehicle sensing system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system for a vehicle that utilizes one or more sensors or cameras (preferably one or more CMOS cameras) to capture image data representative of images exterior of the vehicle. The system enhances communication of RF signals from the sensor (which may be disposed at a rear of the vehicle or at the rear of a trailer towed by the vehicle) to a control unit of the vehicle by reflecting the RF signals off of the road beneath the vehicle and receiving the reflected RF signals at a receiver at a forward portion of the vehicle.

These and other objects, advantages, purposes and features of the present invention will become apparent upon review of the following specification in conjunction with the drawings.

BRIEF DESCRIPTION OF THE DRAWINGS

FIG. 1 is a side elevation of a vehicle and trailer with a vision system in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle, such as a truck towing a large trailer, includes a sensor (such as a camera of an imaging system or vision system) that is disposed at the rear of the trailer and senses or views rearward of the trailer (FIG. 1). The system includes a control or electronic control unit (ECU) or processor or processing module that is operable to process data captured by the sensor (such as image data captured by a camera) and that may detect objects or the like and/or provide displayed images at a display device for viewing by the driver of the vehicle. The wireless data transfer or signal communication from the camera to the ECU comprises a radio frequency (RF) antenna at the rear of the vehicle (and in communication with the sensor or camera, such a via a wired or wireless communication link) and an RF antenna at the vehicle (such as at a rear portion of the towing vehicle and remote from the trailer RF antenna), which is in communication with the control unit, such as via a wired or wireless communication link). The RF antennas wirelessly communicate with one another by reflecting the transmitted RF waves off of the road surface along which the vehicle is traveling, as discussed below.

When a sensor, such as a video camera, is located at the far or rearward end of a trailer, the trailer blocks the RF signals from connecting between the sensor (and transmitting antenna associated with and in communication with the sensor) and the processing module (and receiving antenna associated with and in communication with the processing module). This is due to most commercial cargo trailers being made of metal components that block the path of RF signals. Since RF signals do not bend around corners, the system or method of the present invention connects the sensor and the processing module by forcing or directing the RF signals to reflect or bounce off a hard surface capable of reflecting RF waves. In the case of road transport vehicles, the road surface beneath the vehicle and trailer is always available to be a reflective surface. While such a road surface has limited reflectivity, even reflecting a small portion of the total energy or signal is usually sufficient to complete the connection. Improvement in the amount of available signal can be improved by using directional RF antennae at both locations.

In the embodiment shown in FIG. 1, two RF modules, one for the sensor or camera at the trailer and one for the processing module at the vehicle, are located at the respective lower ends of the trailer and towing vehicle to allow them to beam signals off the road surface below the trailer. The RF modules are in wired or wireless communication with the respective sensor or processing module so that the wireless, reflected communication between the RF modules establishes communication of data and control signals between the processing module or control unit and the sensor or camera.

In the illustrated embodiment, the sensor is disposed at the rear of the truck trailer and communicates with the trailer-mounted RF antenna, which transmits RF signals representative of the captured image data and beams the RF signals downward and forward toward the road surface along which the vehicle and trailer are traveling, so that the RF signals reflect off the road surface and upward and forward toward the vehicle-mounted RF antenna. The vehicle-mounted RF antenna receives the reflected RF signals and communicates representative signals to the processing module of the vehicle. The trailer RF antenna may comprise a RF transmitting antenna and a RF receiving antenna, while the vehicle RF antenna may also comprise a RF transmitting antenna and a RF receiving antenna, such that two-way communication is provided between the vehicle and trailer antennas via the reflecting RF signals, such as can be seen via the arrows shown in FIG. 1. Thus, signals representative of image data captured by the trailer-mounted camera are communicated to the vehicle-mounted processing module, while control signals generated by the vehicle-mounted processing module are communicated to the trailer-mounted camera, via the RF antennas and the reflecting of the transmitted RF signals off the road surface along which the vehicle and trailer are traveling.

Wireless transmission of data and video using industry standard protocol is the preferred method of intercommunication, which will simplify coupling different towing vehicles to different trailers. Whenever a towing vehicle is paired with a trailer, the two wireless systems can be paired to each other in the field. As an alternative, the remote sensor and trailer RF antenna can remain with the towing vehicle and can be attached to every new trailer as part of the mechanical trailer coupling procedure (such that the trailer antenna and the vehicle antenna are already paired and in communication with one another once the trailer antenna is mounted at a trailer to be towed by that vehicle).

The present invention thus provides for wireless communication between a sensor or camera at the rear of a trailer and a control unit or processor at the vehicle towing the trailer. The wireless communication from the trailer RF antenna is directed downward and forward of the rear of the trailer and reflects off of the road surface and is received by the vehicle RF antenna, which then communicates the signals to the control unit or processor. Likewise, wireless communication of RF signals transmitted by the vehicle RF antenna (such as signals generated by the processing module for controlling the trailer mounted camera) is provided by beaming or directing the RF signals downward and rearward of the vehicle RF antenna so that the RF signals reflect off of the road surface and are received by the trailer RF antenna, which then communicates the signals to the sensor or camera. The system thus is able to reflect the RF signals off of the road so that the signals are communicated with reduced interference from the trailer structure. The system thus takes into account that the two antennas of the vehicle do not have a line of sight, and uses a reflective surface (that reflects radio frequency signals or the like), such as the always available road surface (for ground transport vehicles), as a way to provide an indirect communication path for the signals.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066 and/or U.S. patent application Ser. No. 15/897,268, filed Feb. 15, 2018, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663;

5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, and/or International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle towing a trailer, said vision system comprising:
    a camera disposed at a rear portion of a trailer being towed by a vehicle and viewing rearward of the trailer, wherein said camera captures video image data;
    a control unit disposed at the vehicle towing the trailer;
    a trailer radio frequency (RF) antenna disposed at a lower portion of the trailer, wherein said trailer RF antenna is in data communication with said camera, and wherein said trailer RF antenna comprises a directional trailer RF transmitting antenna, and wherein said directional trailer RF transmitting antenna is directed to principally transmit in a direction downward and forward in the direction of travel of the vehicle and trailer;
    a vehicle RF antenna disposed at a lower portion of the vehicle, wherein said vehicle RF antenna is in data communication with said control unit, and wherein said vehicle RF antenna comprises a vehicle RF receiving antenna;
    wherein, with the vehicle towing the trailer and traveling on a road surface, said directional trailer RF transmitting antenna transmits RF signals representative of video image data captured by said camera forward and downward toward the road surface so that the transmitted RF signals reflect off the road surface and toward said vehicle RF receiving antenna so as to be received by said vehicle RF receiving antenna disposed at the lower portion of the vehicle; and
    wherein said vehicle RF receiving antenna receives the reflected RF signals representative of video image data captured by said camera and communicates data to said control unit representative of the received reflected RF signals.

2. The vision system of claim 1, comprising a display screen disposed in a cabin of the vehicle and viewable by a driver of the vehicle, wherein video images derived from video image data captured by said camera are displayed on said display screen.

3. The vision system of claim 2, wherein said vehicle RF antenna comprises a vehicle RF transmitting antenna and wherein said trailer RF antenna comprises a trailer RF receiving antenna.

4. The vision system of claim 3, wherein said vehicle RF transmitting antenna is operable to wirelessly transmit RF signals toward the road surface so that the RF signals transmitted by said vehicle RF transmitting antenna reflect off the road surface and toward said trailer RF receiving antenna so that the transmitted and reflected RF signals are received by said trailer RF receiving antenna.

5. The vision system of claim 4, wherein signals representative of the transmitted and reflected RF signals received by said trailer RF receiving antenna are communicated to said camera for control of said camera.

6. The vision system of claim 5, wherein said trailer RF antenna is in wired data communication with said camera.

7. The vision system of claim 1, wherein said directional trailer RF transmitting antenna is disposed at the rear portion of the trailer.

8. The vision system of claim 1, wherein said vehicle RF receiving antenna is disposed at a rear portion of the vehicle.

9. The vision system of claim 1, wherein said trailer RF antenna is in wired data communication with said camera.

10. A vision system for a vehicle towing a trailer, said vision system comprising:
    a camera disposed at a rear portion of a trailer being towed by a vehicle and viewing rearward of the trailer, wherein said camera captures video image data;
    a control unit disposed at the vehicle towing the trailer;
    a trailer radio frequency (RF) antenna disposed at the trailer, wherein said trailer RF antenna is in data communication with said camera, and wherein said trailer RF antenna comprises a directional trailer RF transmitting antenna and a trailer RF receiving antenna, and wherein said directional trailer RF transmitting antenna is directed to principally transmit in a direction downward and forward in the direction of forward travel of the vehicle and trailer;
    wherein said trailer RF antenna is disposed at a lower portion of the rear portion of the trailer;
    a vehicle RF antenna disposed at the vehicle, wherein said vehicle RF antenna is in data communication with said control unit, and wherein said vehicle RF antenna comprises a vehicle RF receiving antenna and a directional vehicle RF transmitting antenna, and wherein said directional vehicle RF transmitting antenna is directed to principally transmit in a direction downward and rearward of the vehicle;
    wherein said vehicle RF antenna is disposed at a rear portion of the vehicle;
    wherein, with the vehicle towing the trailer and traveling on a road surface, said directional trailer RF transmitting antenna transmits RF signals representative of video image data captured by said camera forward and downward toward the road surface so that the transmitted RF signals reflect off the road surface and toward said vehicle RF receiving antenna so as to be received by said vehicle RF receiving antenna disposed at the vehicle;
    wherein said vehicle RF receiving antenna receives the reflected RF signals representative of video image data captured by said camera and communicates data to said control unit representative of the received reflected RF signals;
    wherein said directional vehicle RF transmitting antenna is operable to wirelessly transmit RF signals rearward and downward toward the road surface so that the RF signals transmitted by said directional vehicle RF transmitting antenna reflect off the road surface and toward said trailer RF receiving antenna so that the transmitted and reflected RF signals are received by said trailer RF receiving antenna; and wherein signals representative of the transmitted and reflected RF signals received by said trailer RF receiving antenna are communicated to said camera for control of said camera.

11. The vision system of claim 10, comprising a display screen disposed in a cabin of the vehicle and viewable by a driver of the vehicle, wherein video images derived from video image data captured by said camera are displayed on said display screen.

12. The vision system of claim 10, wherein said vehicle RF receiving antenna is disposed at a lower portion of the rear portion of the vehicle.

13. A vision system for a vehicle towing a trailer, said vision system comprising:
   a camera disposed at a rear portion of a trailer being towed by a vehicle and viewing rearward of the trailer, wherein said camera captures video image data;
   a control unit disposed at the vehicle towing the trailer;
   a trailer radio frequency (RF) antenna disposed at the trailer, wherein said trailer RF antenna is in data communication with said camera, and wherein said trailer RF antenna comprises a directional trailer RF transmitting antenna, and wherein said directional trailer RF transmitting antenna is directed to principally transmit in a direction downward and forward in the direction of travel of the vehicle and trailer;
   wherein said trailer RF antenna is disposed at a lower portion of the rear portion of the trailer;
   wherein said trailer RF antenna is in wired data communication with said camera;
   a vehicle RF antenna disposed at the vehicle, wherein said vehicle RF antenna is in data communication with said control unit, and wherein said vehicle RF antenna comprises a vehicle RF receiving antenna;
   wherein said vehicle RF receiving antenna is disposed at a lower portion of a rear portion of the vehicle;
   wherein, with the vehicle towing the trailer and traveling on a road surface, said directional trailer RF transmitting antenna transmits RF signals representative of video image data captured by said camera principally forward and downward toward the road surface so that the transmitted RF signals reflect off the road surface and toward said vehicle RF receiving antenna so as to be received by said vehicle RF receiving antenna disposed at the lower portion of the rear portion of the vehicle; and
   wherein said vehicle RF receiving antenna receives the reflected RF signals representative of video image data captured by said camera and communicates data to said control unit representative of the received reflected RF signals.

14. The vision system of claim 13, comprising a display screen disposed in a cabin of the vehicle and viewable by a driver of the vehicle, wherein video images derived from video image data captured by said camera are displayed on said display screen.

15. The vision system of claim 13, wherein said vehicle RF antenna comprises a vehicle RF transmitting antenna and wherein said trailer RF antenna comprises a trailer RF receiving antenna.

16. The vision system of claim 15, wherein said vehicle RF transmitting antenna is operable to wirelessly transmit RF signals toward the road surface so that the RF signals transmitted by said vehicle RF transmitting antenna reflect off the road surface and toward said trailer RF receiving antenna so that the transmitted and reflected RF signals are received by said trailer RF receiving antenna.

17. The vision system of claim 16, wherein signals representative of the transmitted and reflected RF signals received by said trailer RF receiving antenna are communicated to said camera for control of said camera.

* * * * *